(12) United States Patent
Zhuge et al.

(10) Patent No.: US 11,651,529 B2
(45) Date of Patent: May 16, 2023

(54) IMAGE PROCESSING METHOD, APPARATUS, ELECTRONIC DEVICE AND COMPUTER READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/843,248

(22) Filed: Jun. 17, 2022

(65) Prior Publication Data

US 2022/0319062 A1 Oct. 6, 2022

Related U.S. Application Data

(63) Continuation of application No. PCT/CN2020/136993, filed on Dec. 16, 2020.

(30) Foreign Application Priority Data

Dec. 18, 2019 (CN) .......................... 201911306421.6

(51) Int. Cl.
*G06T 11/00* (2006.01)
*G06T 7/38* (2017.01)
(Continued)

(52) U.S. Cl.
CPC .............. *G06T 11/00* (2013.01); *G06T 7/38* (2017.01); *G06T 7/70* (2017.01); *G06V 10/44* (2022.01);
(Continued)

(58) Field of Classification Search
CPC .............. G06T 11/00; G06T 7/38; G06T 7/70
See application file for complete search history.

(56) References Cited

U.S. PATENT DOCUMENTS 10,372,972 B2 8/2019 Kato et al.
2012/0299945 A1 11/2012 Aarabi
(Continued)

FOREIGN PATENT DOCUMENTS

CN 103116902 A 5/2013
CN 104899825 A 9/2015
(Continued)

OTHER PUBLICATIONS

Search Report and Written Opinion dated Mar. 17, 2021 for PCT Application No. PCT/CN2020/136993.
(Continued)

*Primary Examiner* — Yi Yang

(57) ABSTRACT

The embodiment of the present disclosure discloses an image processing method, apparatus, electronic device and computer readable storage medium. The image processing method includes identifying a first object in a first video frame image and a second object located in the first object; in accordance with a position of the first object in the first video frame image, overlaying a third object as a foreground image on the first video frame image to obtain a second video frame image; wherein the third object overlays the first object in the second video frame image; in accordance with a position of the second object in the first video frame image, overlapping the second object as a foreground image on the third object of the second video frame image to obtain a third video frame image.

14 Claims, 5 Drawing Sheets

(51) Int. Cl.
*G06T 7/70* (2017.01)
*G06V 20/40* (2022.01)
*G06V 10/44* (2022.01)

(52) U.S. Cl.
CPC .... *G06V 20/40* (2022.01); *G06T 2207/10016* (2013.01); *G06T 2207/10024* (2013.01)

(56) References Cited

U.S. PATENT DOCUMENTS

| | | | |
|---|---|---|---|
| 2015/0248581 A1* | 9/2015 | Gouda | G06T 19/006 345/633 |
| 2015/0249810 A1* | 9/2015 | Sasaki | G06T 7/11 345/589 |
| 2016/0293080 A1 | 10/2016 | Fan | |
| 2018/0005448 A1 | 1/2018 | Choukroun et al. | |
| 2019/0005305 A1* | 1/2019 | Huang | G06V 20/40 |
| 2019/0014884 A1* | 1/2019 | Fu | G06T 19/20 |
| 2019/0098149 A1* | 3/2019 | Shinoda | A45D 33/38 |
| 2019/0266753 A1* | 8/2019 | Dworakowski | G06T 7/80 |
| 2019/2066753 | 8/2019 | Dworakowski et al. | |
| 2019/0362521 A1* | 11/2019 | Kuo | H04N 5/272 |
| 2020/0082158 A1* | 3/2020 | Hussain | G06V 40/171 |
| 2022/0005266 A1 | 1/2022 | Glazistov et al. | |

FOREIGN PATENT DOCUMENTS

| | | |
|---|---|---|
| CN | 107563962 A | 1/2018 |
| CN | 107680105 A | 2/2018 |
| CN | 107808372 A | 3/2018 |
| CN | 107820027 A | 3/2018 |
| CN | 108171716 A | 6/2018 |
| CN | 108416835 A | 8/2018 |
| CN | 108957742 A | 12/2018 |
| CN | 109410119 A | 3/2019 |
| CN | 109658420 A | 4/2019 |
| CN | 110475150 A | 11/2019 |
| JP | 2005031745 A | 2/2005 |
| JP | 2019527410 A | 9/2019 |
| KR | 20170013379 A | 2/2017 |
| KR | 20180054406 A | 5/2018 |
| RU | 2703327 C1 | 10/2019 |
| WO | 2017016511 A1 | 2/2017 |
| WO | WO2019014646 A1 | 1/2019 |

OTHER PUBLICATIONS

Extended European Search Report dated Dec. 16, 2022 in European Patent Application No. 20902504.8 (8 pages).
First Examination Report dated Oct. 21, 2022 in Indian Patent Application No. 202227035617, with English translation (8 pages).
Notice of Preliminary Rejection dated Nov. 16, 2022 in Korean Patent Application No. 10-2022-7023064, with English translation (8 pages).
Zhang, Y., et al. "Method for moving foreground detection based on image fusion", Modern Electronics Technique, Dec. 2013, vol. 36 No. 24, Abstract only (3 pages).
Zafari, S., et al. "Segmentation of Overlapping Elliptical Objects in Silhouette Images", IEEE Transactions On Image Processing, vol. 24, No. 12, Dec. 2015 (11 pages).

* cited by examiner

IMAGE PROCESSING METHOD, APPARATUS, ELECTRONIC DEVICE AND COMPUTER READABLE STORAGE MEDIUM

This disclosure claims the priority of a Chinese patent application No. 201911306421.6, titled "Image processing method, apparatus, electronic device and computer readable storage medium", filed in China Patent Office on Dec. 18, 2019, which is hereby incorporated by reference in its entirety.

FIELD OF THE INVENTION

The invention relates to the field of image processing, in particular to an image processing method, apparatus, electronic device and computer readable storage medium.

BACKGROUND

With the development of computer network and the popularity of smart phones, ordinary users can no longer be satisfied with expressing their feelings only by means of monotonous pictures and words. Videos are deeply loved by users due to being presented as more diverse contents and forms and bringing intuitive feelings, and gradually become popular. It has gradually become a trend for ordinary users to make original videos. However, on the other hand, the original selfie video is expressed in an insipid form. At the same time, we can see that the application of video special effects in film and television works is more and more rich, and the expressed content forms are more diverse. It can be said that video special effects are the support and guarantee of a successful film and television work.

However, in the prior art, special effects are generally made by directly overlaying the effects on a target object (such as a human face), and the overlaid place is blocked by the special effects, so that original characteristics of the target object cannot be embodied, resulting in that the actual effect of the special effects is quite stiff and lacks realism.

DISCLOSURE OF THE INVENTION

This disclosure is provided to introduce some concepts in a simplified form, which will be further described in the following detailed description. This disclosure is not intended to identify key features or essential features of the claimed subject matter, nor intended to limit the scope of the claimed subject matter.

In a first aspect, an embodiment of the present disclosure provides an image processing method, comprising:

identifying a first object in a first video frame image and a second object located in the first object;

in accordance with a position of the first object in the first video frame image, overlaying a third object as a foreground image on the first video frame image to obtain a second video frame image; wherein the third object overlays the first object in the second video frame image;

in accordance with a position of the second object in the first video frame image, overlapping the second object as a foreground image on the third object of the second video frame image to obtain a third video frame image.

In a second aspect, an embodiment of the present disclosure provides an image processing apparatus, comprising:

an object identification module configured to identify a first object in a first video frame image and a second object located in the first object;

a second video frame image generation module configured to, in accordance with a position of the first object in the first video frame image, overlay a third object as a foreground image on the first video frame image to obtain a second video frame image; wherein the third object overlays the first object in the second video frame image;

a third video frame generation module configured to, in accordance with a position of the second object in the first video frame image, overlap the second object as a foreground image on the third object of the second video frame image to obtain a third video frame image.

In a third aspect, an embodiment of the present disclosure provides an electronic device including at least one processor; and, a memory communicatively connected with the at least one processor; wherein the memory stores instructions capable of being executed by the at least one processor, and the instructions are executed by the at least one processor to enable the at least one processor to execute any one of the image processing methods in the above-mentioned first aspect.

In a fourth aspect, an embodiment of the present disclosure provides a non-transitory computer-readable storage medium, characterized in that, the non-transitory computer-readable storage medium stores computer instructions for causing a computer to execute any one of the image processing methods in the above-mentioned first aspect.

In a fifth aspect, an embodiment of the present disclosure provides a computer program, which, when executed by a computer, executes any one of the image processing methods in the above-mentioned first aspect.

The disclosed embodiment discloses an image processing method, apparatus, electronic device and computer readable storage medium. The image processing method includes identifying a first object in a first video frame image and a second object located in the first object; in accordance with a position of the first object in the first video frame image, overlaying a third object as a foreground image on the first video frame image to obtain a second video frame image; wherein the third object overlays the first object in the second video frame image; in accordance with a position of the second object in the first video frame image, overlapping the second object as a foreground image on the third object of the second video frame image to obtain a third video frame image. Through the above method, it is possible to solve the technical problem in the art that the special effects overlaying on the object can't reflect the original features of the object so as to cause lack of realism.

The above description only belongs to a summary of the technical scheme of the present disclosure. In order to make the technical means of the present disclosure to be clearer and capable of being implemented in accordance with the contents in the description, and in order to make the above and other objects, features and advantages of the present disclosure to become more apparent, better embodiments will be listed and described in detail in cooperation with the drawings as follows.

DESCRIPTION OF THE DRAWINGS

The above and other features, advantages and aspects of various embodiments of the present disclosure will become more apparent in conjunction with the accompanying drawings and with reference to the following detailed description. Throughout the drawings, the same or similar reference numerals refer to the same or similar elements. It should be

DETAILED DESCRIPTION OF PREFERRED EMBODIMENTS

Figure 1:
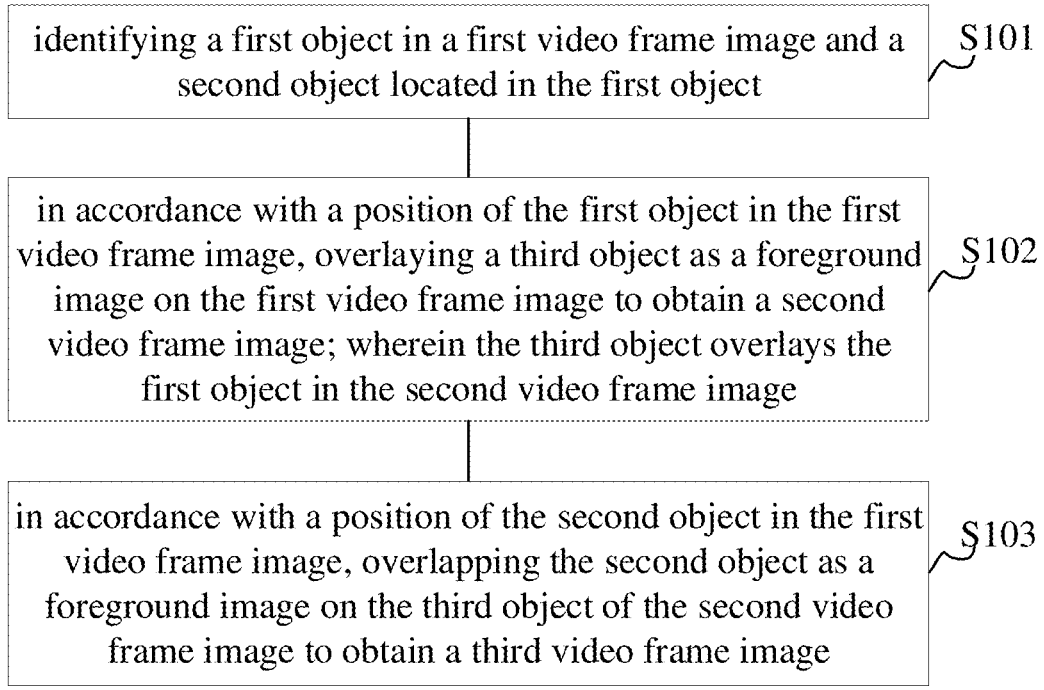
FIG. 1 is a flowchart of an embodiment of an image processing method provided by the present disclosure.

Embodiments of the present disclosure will be described in more detail below with reference to the accompanying drawings. Although some embodiments of the present disclosure are shown in the drawings, it should be understood that the present disclosure can be implemented in various forms and should not be interpreted as being limited to the embodiments set forth here. On the contrary, these embodiments are provided for more thorough and complete understanding of the present disclosure. It should be understood that the drawings and embodiments of this disclosure are only for illustrative purposes, and are not intended to limit the scope of protection of this disclosure.

It should be understood that the steps described in the method embodiments of the present disclosure can be performed in different orders and/or in parallel. In addition, the method embodiments may include additional steps and/or omit the steps shown. The scope of the present disclosure is not so limited.

As used herein, the term "including" and its variations are open including, that is, "including but not limited to". The term "based on" means "based at least in part on". The term "an embodiment" means "at least one embodiment"; the term "another embodiment" means "at least one another embodiment"; the term "some embodiments" means "at least some embodiments". Relevant definitions of other terms will be given in the following description.

It should be noted that the concepts of "first", "second", etc. mentioned in this disclosure are only used to distinguish different devices, modules or units, and are not used to limit the order or interdependence of the functions performed by these devices, modules or units.

It should be noted that the modifications of "one" and "multiple" mentioned in this disclosure are illustrative rather than restrictive, and those skilled in the art should understand that they should be understood as "one or more", unless clearly indicated in the context.

The names of messages or information exchanged among multiple devices in embodiments of the present disclosure are only for illustrative purposes, and are not intended to limit the scopes of these messages or information.

FIG. 1 is a flowchart of an embodiment of an image processing method provided by embodiments of the present disclosure. The image processing method provided by this embodiment can be executed by an image processing apparatus, which can be implemented as software or a combination of software and hardware. The image processing apparatus can be integrated in a certain device in an image processing system, such as an image processing server or an image processing terminal device. As shown in FIG. 1, this method includes the following steps:

S101, identifying a first object in a first video frame image and a second object located in the first object;

In this step, the first video frame image is acquired by an image sensor or a memory. The image sensor refers to various devices that can collect images, and typical image sensors are video cameras, cameras, etc. In this embodiment, the image sensor can be a camera on a terminal device, such as a front camera or a rear camera on a smart phone, and the images collected by the camera can be directly displayed on the display screen of the mobile phone; wherein the memory is a local memory or a network memory, and a video frame image is acquired through the storage location of the local memory or the storage address of the network memory, and the video frame image in the memory is a pre-shot video frame image file, which can be displayed on the display device of the terminal device through a player in the terminal device.

The first video frame image includes a first object, which can be any object in the first video frame image. Illustratively, the first object is a human face; the second object is a part of the first object, located in the first object, for example, when the first object is a human face, the second object is a facial feature such as eyes, mouth, etc.

In this embodiment, the key points of an object are used to identify the object; for example, the object can be identified by a plurality of preset key points, and if the plurality of key points are identified, the object is identified. Optionally, the identifying a first object in a first video frame image and a second object located in the first object comprises: identifying a plurality of first key points of the first object and a plurality of second key points of the second object in the first video frame image; identifying the first object based on the plurality of first key points of the first object; identifying the second object based on the plurality of second key points of the second object, wherein the plurality of second key points are edge key points of the second object. The edge key points determine the outline of the second object. For example, the first object is a human face, and the second object is eyes or mouth in the human face. The plurality of first key points can comprise a center key point of two eyes on a human face and a nose tip key point, and when the center key point of two eyes and the nose tip key point are identified, the human face is identified; the second key points comprises edge key points of the eyes and edge key points of the mouth, similarly, when the edge key points of the eyes and the edge key points of the mouth are identified, the eyes and the mouth are identified. For example, the first key points and the second key points can be identified by using a deep learning algorithm, and a deep learning network can be trained by directly using a set of frame images labelled with the first key point and the second key point as described above, so as to obtain a network model which can regress the first key points and the second key points, and then the first video frame image is input into the network model, if the first video frame image includes the first object and the second object, then the network model will output the positions of the first key points and the second key points, thereby directly identifying the first object and the second object, and identifying positions of the first key points and the second key points. It can be understood that the first key points and the second key points can also be identified by any other key point identification algorithm, which is not repeated here.

S102, in accordance with a position of the first object in the first video frame image, overlaying a third object as a foreground image on the first video frame image to obtain a second video frame image; wherein the third object overlays the first object in the second video frame image;

Optionally, the third object is a three-dimensional virtual object, and a two-dimensional projection area of the three-dimensional virtual object in the first video frame image is larger than the area of the first object, that is, the third object can completely overlay the first object. For example, the three-dimensional virtual object may be a spherical virtual object such as a three-dimensional orange, a three-dimensional ball, a three-dimensional watermelon and so on. The third object comprises an anchor point of the third object, which is used for locating the position of the third object.

It can be understood that the third object can be any object, not limited to the above-mentioned three-dimensional virtual objects, such as two-dimensional virtual objects and real objects. The real objects are objects formed in the captured images of real objects, such as human face images and animal face images included in the first video frame image, at this time, the animal face image can be overlaid on the human face image as the third object.

In this step, when the third object is overlaid on the first object, a single key point alignment method can be used to determine the overlay position of the third object. Exemplary, the third object includes the anchor point of the third object thereon, and an anchor key point of the first object corresponding to the anchor point of the third object is preset on the first object, and the anchor key point of the first object may be one of the above-mentioned first key points. When a third object is overlaid on the first video frame image as a foreground image, the anchor point of the third object can be aligned with the anchor key point of the first object, so that the third object can be overlaid on the first object.

Figure 2:
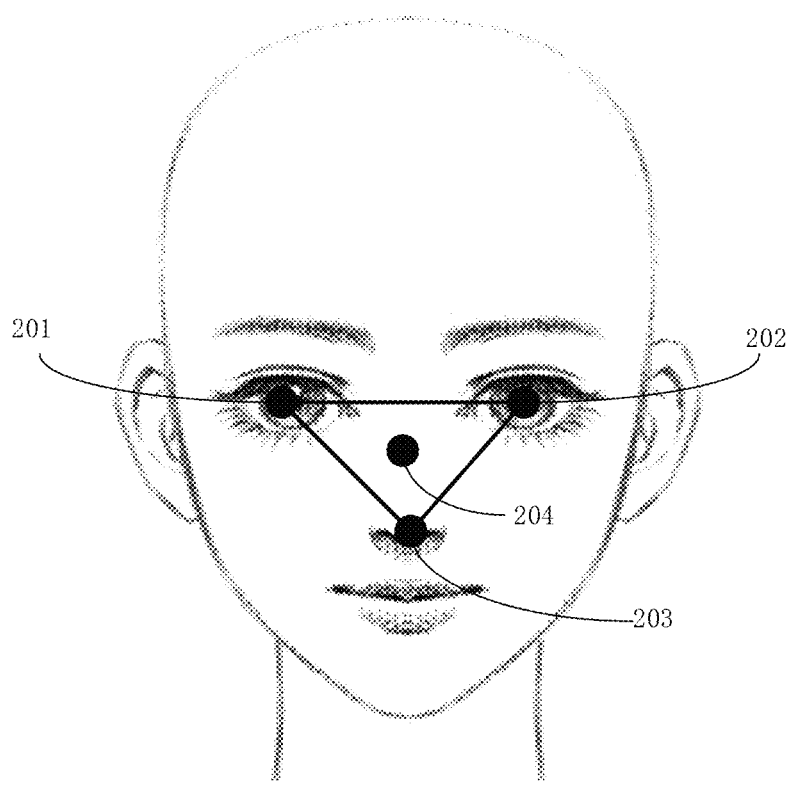
FIG. 2 is a schematic diagram of calculating anchor points for a human face in an embodiment of the image processing method provided by this disclosure.

Sometimes, alignment using a single key point is not accurate, so optionally, in accordance with the position of the first object in the first video frame image, overlaying a third object as a foreground image on the first video frame image to obtain a second video frame image may comprises: calculating an anchor point of the first object in the first video frame image based on the plurality of first key points of the first object in the first video frame image; by aligning an anchor point of the third object with the anchor point of the first object in the first video frame image, overlaying the third object as a foreground image in the first video frame image to obtain the second video frame image. In this alternative embodiment, the anchor point of the first object is calculated from a plurality of first key points, which can be more accurate than a single first key point positioning, since the anchor point of the first object includes position information about the plurality of first key points. For example, as shown in FIG. 2, the first object is a human face, and the plurality of first key points are the center key points 201 and 202 of the left and right eyes and the nose tip key point 203, the anchor point of the human face can be calculated from the center key points of the two eyes and the nose tip key point each accounting for ⅓ by weight, so that it can be calculated the center point 204 of a triangle formed by the center key points of the two eyes and the nose tip key point, so that the influence of the position distortion of a single key point on the position of the anchor point is much smaller, and the anchor point of the first object is stable and accurate.

After obtaining the anchor point of the first object, setting the anchor point of the third object at the position of the anchor point of the first object, and rendering the first video frame image with the third object as the foreground to obtain the second video frame image.

S103, in accordance with a position of the second object in the first video frame image, overlapping the second object as a foreground image on the third object of the second video frame image to obtain a third video frame image.

In step S101, the second object has been identified, wherein the position of the second object in the first video frame object can be determined by the position of the center point of the second object or the plurality of second key points. For example, when identifying the second object, the anchor point of the second object can be directly identified as a key point, or can be calculated based on the plurality of second key points, when calculating the anchor point of the second object, a weight value can be set for each second key point involved in the calculation, and the position of the anchor point of the second object is a weighted average of positions of the plurality of second key points. After obtaining the position of the second object in the first video frame image, the second object is overlapped as a foreground image on the corresponding position of the third object in the second video frame image.

Figure 3:
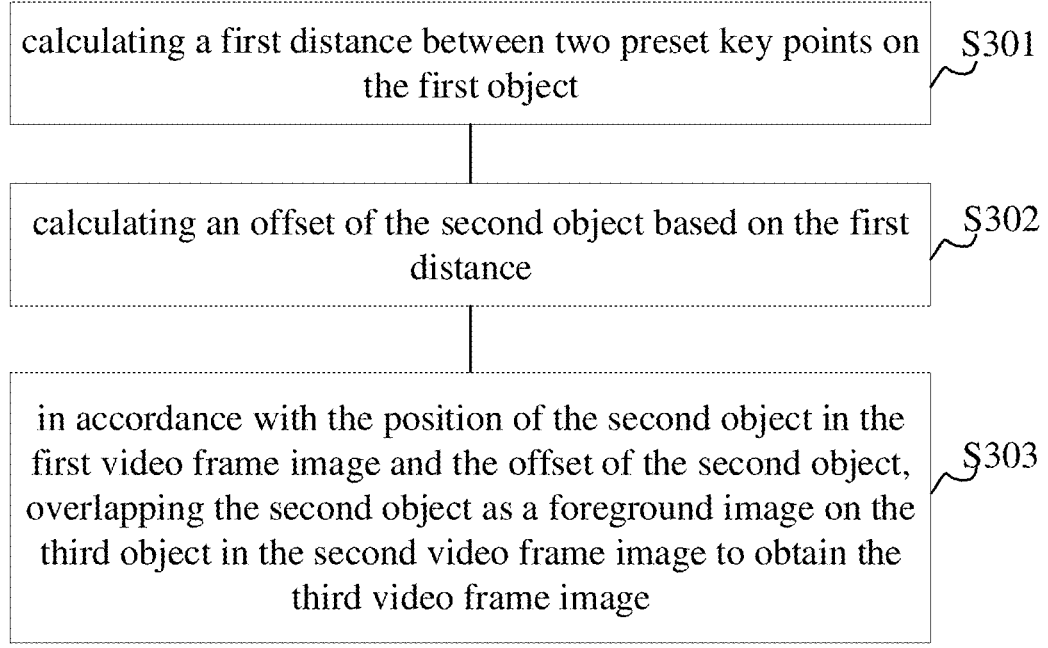
FIG. 3 is a flowchart of a specific example of step S103 in an embodiment of the image processing method provided by the present disclosure.

Optionally, when the third object is a three-dimensional object, because the three-dimensional object has a certain depth (information in the Z-axis direction) but the second object is a two-dimensional object without depth, there will be a certain deviation when the second object is overlapped on the third object, and thus there needs a certain offset when the second object is overlapped on the third object, so that the overlapping result is more natural. At this time, as shown in FIG. 3, step S103 may include:

S301, calculating a first distance between two key points preset on the first object;

S302, calculating an offset of the second object based on the first distance;

S303, in accordance with the position of the second object in the first video frame image and the offset of the second object, overlapping the second object as a foreground image on the third object in the second video frame image to obtain the third video frame image.

The two key points preset on the first object can be any two key points on the first object. For example, the preset two key points are two key points on the first object that are bilaterally symmetrical. For example, if the first object is a human face in the above embodiment, the preset two key points can be central key points of the left and right eyes. For example, the calculation of the offset of the second object based on the first distance may be to multiply the first distance by an offset coefficient, which depends on the value of the first distance. For example, the larger the value of the first distance is, the larger the offset coefficient is, so that the larger the offset of the second object is, and the achieved effect is that the closer the first object is to the lens, the more the second object will be offset, to adapt to the three-dimensional surface of the third object.

Figure 4:
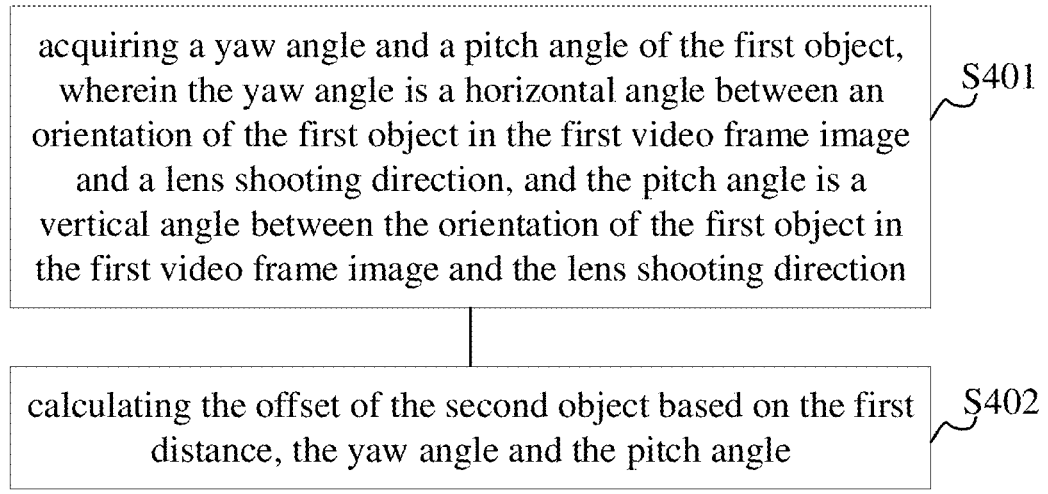
FIG. 4 is a flowchart of a specific example of step S302 in an embodiment of the image processing method provided by the present disclosure.

The above offset calculation belongs to a kind of approximate calculation, and optionally, the offset can be calculated more accurately. At this time, as shown in FIG. 4, the step S302 can include:

S401, acquiring a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;

S402, calculating the offset of the second object based on the first distance, the yaw angle and the pitch angle.

Specifically, the calculation process in the above step S402 can be expressed by the following formula:

$$dx = -\text{sign}(yaw) \times \sqrt{2} \times \text{dist}_{eye} \times \cos(\theta_1) \times \sqrt{1-\cos(yaw)}$$

$$dy = -\text{sign}(pitch) \times \sqrt{2} \times \text{dist}_{eye} \times \cos(\theta_2) \times \sqrt{1-\cos(pitch)}$$

Among them, sign is an operation of obtaining symbols, dx is the offset of the second object in the X-axis direction, dy is the offset of the second object in the Y-axis direction, $\text{dist}_{eye}$ is the first distance, yaw is the yaw angle of the first object, pitch is the pitch angle of the first object, $\theta_1$ is the initial relative pitch angle when the second object is facing the front, and $\theta_2$ is the initial relative yaw angle when the second object is facing the front. Where $\theta_1$ and $\theta_2$ are the preset angle values, because the outer surface of the three-dimensional third object has a certain radian, it needs some attenuation when moving. Take the first object being a human face and the second object being eyes and mouth as an example, since the mouth is located in the lower half of the upper and lower areas of the third object, the initial relative pitch angle of the mouth is large, and since the mouth is located in the middle of the left and right areas of the third object, the initial relative yaw angle of the mouth is 0. The $\theta_1$ and $\theta_2$ of other second objects can be preset with different values according to different third objects, which will not be described here.

Optionally, step S303, in accordance with the position of the second object in the first video frame image and the offset of the second object, overlapping the second object as a foreground image on a third object in the second video frame image to obtain the third video frame image further comprises: performing position offset on an initial anchor point of the second object in the first video frame image in accordance with the offset of the second object to obtain a target anchor point; in the second video frame image, rendering the second object as a foreground image to the position of the target anchor point to obtain the third video frame image. In the above step, the position of the second object in the first video frame image is taken as an initial anchor point, and the initial anchor point comprises an X-axis coordinate value and a Y-axis coordinate value, and the X-axis coordinate value and the Y-axis coordinate value of the initial anchor point are respectively added with the X-axis coordinate value and the Y-axis coordinate value of the offset to obtain a target anchor point; then, in the second video frame image, the second object is rendered as the foreground to the position of the second target anchor point to obtain a third video frame image, and the second object is overlapped on the third object on the third video frame image, which can truly reflect the characteristics of the first object, thus making the special effect more realistic.

Optionally, since the sizes of the third object and the second object may not be the same, before overlapping the second object as the foreground image on the third object of the second video frame image, the method further comprises scaling the second object according to the third object. At this time, the scaling ratio of the second object can be determined according to the ratio of the distance between two predetermined key points on the third object and the distance between two predetermined key points on the first object, so that when the third object is larger than the first object, the second object is scaled up, and when the third object is smaller than the first object, the second object is scaled down. The second object overlapped on the third object of the second video frame image after this step is the second object after scaling.

Furthermore, after the target object is overlaid on the three-dimensional virtual object, since there may exist a difference between the color of the target object and the color of the three-dimensional virtual object, a further color processing can be utilized to eliminate such a difference, so that the overlapping effect of the second object and the third object is more natural. Further, after the step S103, the method further comprises:

converting color spaces of the second object and the third object in the third video frame image from a RGB (Red, Green, Blue) color space to a HSV (Hue, Saturation, Value) color space;

replacing a value of the second object in H channel in the HSV color space with a value of the third object in the H channel;

converting the color spaces of the second object and the third object from the HSV space to the RGB color space to obtain a fourth video frame image.

Through the above steps, the RGB space is converted into the HSV space, and the color of the second object is converted into the color of the third object at the target position while preserving the original saturation and brightness of the second object, so that the second object can fuse with the third object better, which makes the second object more like a part of the third object and more realistic.

The embodiments of the present disclosure disclose an image processing method, apparatus, electronic device and computer readable storage medium. The image processing method includes identifying a first object in a first video frame image and a second object located in the first object; in accordance with a position of the first object in the first video frame image, overlaying a third object as a foreground image on the first video frame image to obtain a second video frame image; wherein the third object overlays the first object in the second video frame image; in accordance with a position of the second object in the first video frame image, overlapping the second object as a foreground image on the third object of the second video frame image to obtain a third video frame image. Through the above method, it is possible to solve the technical problem in the art that the special effects overlaying on the object can't reflect the original features of the object so as to cause lack of realism.

In the above, although the steps in the above method embodiments are described in the above order, it should be clear to those skilled in the art that the steps in the disclosed embodiments are not necessarily executed in the above order, but can also be executed in other order, such as reverse order, parallel order, cross order, etc. Moreover, on the basis of the above steps, those skilled in the art can also add other steps, and these obvious modifications or equivalent alternatives should also be included in the scope of protection of the present disclosure, which will not be repeated here.

Figure 5:
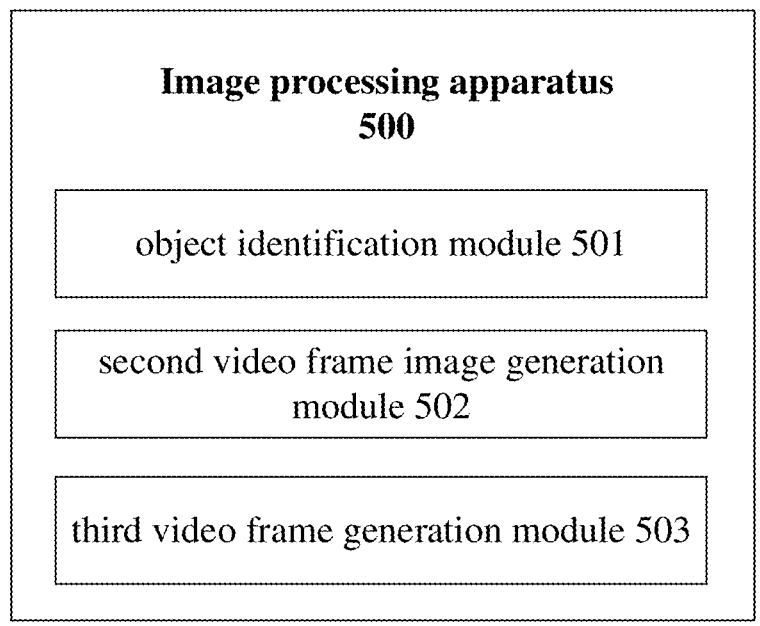
FIG. 5 is a structural schematic diagram of an embodiment of an image processing apparatus provided by an embodiment of the present disclosure.

FIG. 5 is a structural schematic diagram of an embodiment of an image processing apparatus provided by embodiments of the present disclosure. As shown in FIG. 5, the apparatus 500 includes an object identification module 501, a second video frame image generation module 502 and a third video frame generation module 503. Among them, an object identification module 501, configured to identify a first object in a first video frame image and a second object located in the first object;

a second video frame image generation module 502, configured to, in accordance with a position of the first object in the first video frame image, overlay a third object as a foreground image on the first video frame image to obtain a second video frame image; wherein the third object overlays the first object in the second video frame image;

a third video frame generation module 503, configured to, in accordance with a position of the second object in the first video frame image, overlap the second object as a foreground image on the third object of the second video frame image to obtain a third video frame image.

Further, the object identification module 501 is further configured to:

identify a plurality of first key points of the first object and a plurality of second key points of the second object in the first video frame image;

identify the first object based on the plurality of first key points of the first object;

identify the second object based on the plurality of second key points of the second object, wherein the plurality of second key points are edge key points of the second object.

Further, the second video frame image generation module 502 is configured to:

calculate an anchor point of the first object in the first video frame image based on the plurality of first key points of the first object in the first video frame image;

by aligning an anchor point of the third object with the anchor point of the first object in the first video frame image, overlay the third object as a foreground image in the first video frame image to obtain the second video frame image.

Further, the second video frame image generation module 502 is further configured to:

calculate a first distance between two key points preset on the first object;

calculate an offset of the second object based on the first distance;

in accordance with the position of the second object in the first video frame image and the offset of the second object, overlap the second object as a foreground image on the third object in the second video frame image to obtain the third video frame image.

Further, the calculating the offset of the second object according to the first distance comprises:

acquire a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;

calculate the offset of the second object based on the first distance, the yaw angle and the pitch angle.

Further, in accordance with the position of the second object in the first video frame image and the offset of the second object, overlap the second object as a foreground image on the third object in the second video frame image to obtain the third video frame image comprises:

perform position offset on an initial anchor point of the second object in the first video frame image in accordance with the offset of the second object to obtain a target anchor point;

in the second video frame image, render the second object as a foreground image to the position of the target anchor point to obtain the third video frame image.

Furthermore, the image processing apparatus 500 further includes:

a fourth video image generation module configured to convert color spaces of the second object and the third object in the third video frame image to a HSV color space from a RGB color space; replace a value of the second object in H channel in the HSV color space with a value of the third object in the H channel; and convert the color spaces of the second object and the third object from the HSV space to the RGB color space to obtain a fourth video frame image.

The apparatus as shown in FIG. 5 can perform the methods of the embodiments shown in FIGS. 1-4. For the parts not described in detail in this embodiment, please refer to the relevant description of the embodiments shown in FIGS. 1-4. The implementation process and technical effect of the technical scheme can refer to the description in the embodiment shown in FIGS. 1-4, and will not be repeated here.

Figure 6:
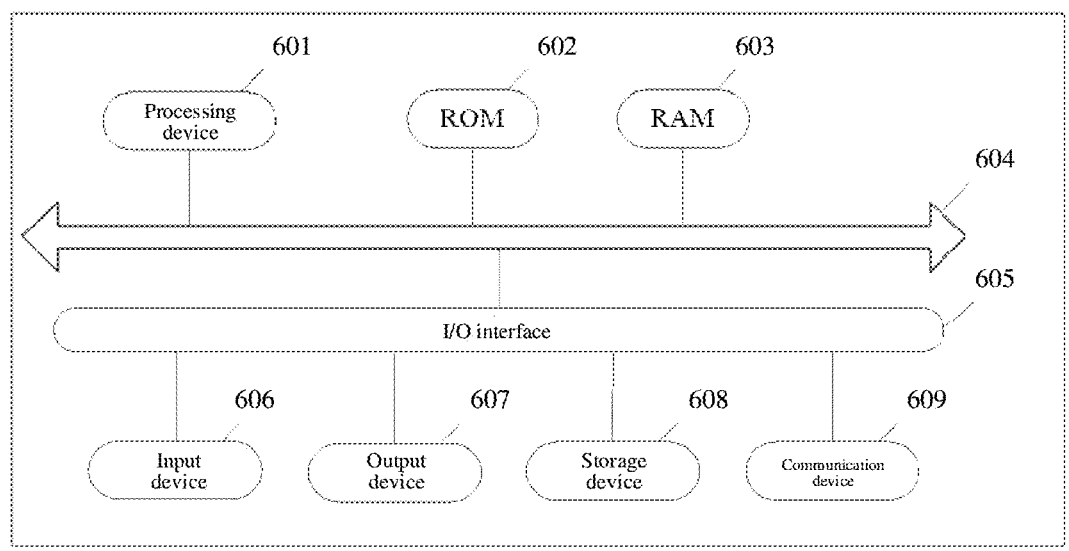
FIG. 6 is a schematic structural diagram of an electronic device provided according to an embodiment of the present disclosure.

Referring to FIG. 6 below, FIG. 6 illustrates a schematic structural diagram of an electronic device (e.g., the terminal device or the server in FIG. 1) 600 suitable for implementing the embodiments of the present disclosure. Terminal devices in the embodiments of the present application may include, but are not limited to, mobile terminals such as mobile phones, notebook computers, digital broadcast receivers, PDAs (personal digital assistants), PADs (tablet computers), PMP (portable multimedia players), vehicle-mounted terminals (for example, vehicle navigation terminals), and fixed terminals such as digital TVs, desktop computers, and the like. The electronic device shown in FIG. 6 is only an example, and should not bring any limitation to the functions and application scopes of the embodiments of the present disclosure.

As shown in FIG. 6, the electronic device 600 may include a processing device (such as a central processing unit, a graphics processor, etc.) 601, which may perform various appropriate actions and processes according to a program stored in a read-only memory (ROM)602 or a program loaded into a random access memory (RAM)603 from a storage device 608. In the RAM 603, various programs and data required for the operation of the electronic device 600 are also stored. The processing device 601, the ROM 602, and the RAM 603 are connected to each other through a bus 604. An input/output (I/O) interface 605 is also connected to the bus 604.

Generally, the following devices can be connected to the I/O interface 605: an input device 606 including, for example, a touch screen, a touch panel, a keyboard, a mouse, a camera, a microphone, an accelerometer, a gyroscope, and the like; an output device 607 including, for example, a liquid crystal display (LCD), a speaker, a vibrator and the like; a storage device 608 including, for example, a magnetic tape, a hard disk, etc.; and a communication device 609. The communication device 609 may allow the electronic device 600 to perform wireless or wired communication with other devices so as to exchange data. Although FIG. 6 shows an electronic device 600 with various components, it should be understood that it is not required to implement or have all the devices shown. More or fewer devices may be implemented or provided instead.

Particularly, according to the embodiments of the present disclosure, the process described above with reference to the flowchart can be implemented as a computer software program. For example, embodiments of the present disclosure include a computer program product, which can include a computer program carried on a non-transitory computer readable medium, the computer program containing program codes for executing the method shown in the flowchart. In such an embodiment, the computer program can be downloaded and installed from the network via the communication device 609, or installed from the storage device 608 or installed from the ROM 602. When the computer program is executed by the processing device 601, the above functions defined in the methods of the embodiments of the present disclosure can be executed.

It should be noted that the above-mentioned computer-readable media of this disclosure can be computer-readable signal media or computer-readable storage media or any combination of the above two. The computer-readable storage medium can be, for example, but not limited to, an electrical, magnetic, optical, electromagnetic, infrared, or semiconductor system, apparatus or device, or any combination of the above. More specific examples of computer-readable storage media may include, but not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, the computer-readable storage medium can be any tangible medium that contains or stores a program that can be used by or in connection with an instruction execution system, apparatus or device. In this disclosure, however, the computer-readable signal media may include data signals propagated in baseband or as part of a carrier wave, in which computer-readable program codes are carried. This propagated data signal can take various forms, including but not limited to, electromagnetic signal, optical signal or any suitable combination of the above. The computer-readable signal medium can also be any computer-readable medium other than the computer-readable storage medium, which can send, propagate or transport a program for use by or in connection with the instruction execution system, apparatus or device. The program codes contained on the computer readable medium can be transmitted via any suitable medium, including but not limited to electric wire, optical cable, RF (radio frequency), etc., or any suitable combination of the above.

In some embodiments, a client and a server can communicate by using any currently known or future developed network protocol such as HTTP (HyperText Transfer Protocol), and can be interconnected with any form or medium of digital data communication (e.g., communication network). Examples of communication networks include local area networks ("LANs"), wide area networks ("WANs"), the internet network (e.g., the Internet) and end-to-end networks (e.g., ad hoc end-to-end networks), as well as any currently known or future developed networks.

The computer readable medium may be included in the electronic device; or it can exist separately without being assembled into the electronic device.

The computer-readable medium carries one or more programs which, when executed by the electronic device, cause the electronic device to identify a first object in a first video frame image and a second object located in the first object; in accordance with a position of the first object in the first video frame image, overlay a third object as a foreground image on the first video frame image to obtain a second video frame image; wherein the third object overlays the first object in the second video frame image; in accordance with a position of the second object in the first video frame image, overlap the second object as a foreground image on the third object of the second video frame image to obtain a third video frame image.

Computer program codes for performing the operations of the present disclosure can be written in one or more programming languages or their combinations, including but not limited to object-oriented programming languages such as Java, Smalltalk, C++, and conventional procedural programming languages such as "C" language or similar programming languages. The program can be executed completely on the user's computer, partially on the user's computer, as an independent software package, partially on the user's computer, partially on a remote computer, or completely on a remote computer or server. In the case of remote computer, the remote computer can be connected to the user computer through any kind of network, including local area network (LAN) or wide area network (WAN), or it can be connected to an external computer (for example, using an Internet service provider to connect through the Internet).

The flowchart and block diagram in the drawings illustrate the architecture, functions and operations of possible implementations of systems, methods and computer program products according to various embodiments of the present disclosure. In this regard, each block in the flowchart or block diagram may represent a module, program segment, or part of code, which contains one or more executable instructions for implementing the specified logical functions. It should also be noted that in some alternative implementations, the functions labelled in the blocks may also occur in a different order than those labelled in the drawings. For example, two consecutive blocks can actually be executed basically in parallel, and sometimes they can be executed in reverse order, depending on the functions involved. It should also be noted that each block in the block diagram and/or flowchart, and the combination of blocks in the block diagram and/or flowchart, can be implemented by a dedicated hardware-based system that performs specified functions or operations, or can be implemented by a combination of dedicated hardware and computer instructions.

The units involved in the embodiments described in this disclosure can be implemented by software or hardware. In some cases, the name of a unit does not constitute a restriction on the unit itself.

The functions described above in this paper can be at least partially performed by one or more hardware logic components. For example, without limitation, exemplary types of hardware logic components that can be used may include: Field Programmable Gate Array (FPGA), Application Specific Integrated Circuit (ASIC), Application Specific Standard Product (ASSP), System-on-Chip (SOC), Complex Programmable Logic Device (CPLD), etc.

In the context of this disclosure, a machine-readable medium can be a tangible medium that can contain or store a program for use by or in connection with an instruction execution system, apparatus or device. The machine-readable medium may be a machine-readable signal medium or a machine-readable storage medium. Machine-readable media can include, but not limited to, electronic, magnetic, optical, electromagnetic, infrared, or semiconductor systems, apparatuses or devices, or any suitable combination of the above. More specific examples of machine-readable storage media will include electrical connection based on one or more wires, portable computer disk, hard disk, random access memory (RAM), read-only memory (ROM), erasable programmable read-only memory (EPROM or flash memory), optical fiber, compact disk read-only memory (CD-ROM), optical storage device, magnetic storage device, or any suitable combination of the above.

The disclosed embodiment also provides a computer program, and when the computer program is executed by a computer, the computer executes the image processing method provided by the embodiments of the present disclosure.

According to one or more embodiments of the present disclosure, there is provided an image processing method including:

identifying a first object in a first video frame image and a second object located in the first object;

in accordance with a position of the first object in the first video frame image, overlaying a third object as a foreground image on the first video frame image to obtain a second video frame image; wherein the third object overlays the first object in the second video frame image;

in accordance with a position of the second object in the first video frame image, overlapping the second object as a foreground image on the third object of the second video frame image to obtain a third video frame image.

Furthermore, the identifying a first object in a first video frame image and a second object located in the first object comprises:

identifying a plurality of first key points of the first object and a plurality of second key points of the second object in the first video frame image;

identifying the first object based on the plurality of first key points of the first object;

identifying the second object based on the plurality of second key points of the second object, wherein the plurality of second key points are edge key points of the second object.

Furthermore, in accordance with the position of the first object in the first video frame image, overlaying a third object as a foreground image on the first video frame image to obtain a second video frame image comprises:

calculating an anchor point of the first object in the first video frame image based on the plurality of first key points of the first object in the first video frame image;

by aligning an anchor point of the third object with the anchor point of the first object in the first video frame image, overlaying the third object as a foreground image in the first video frame image to obtain the second video frame image.

Furthermore, in accordance with the position of the second object in the first video frame image, overlapping the second object as a foreground image on the third object of the second video frame image to obtain a third video frame image comprises:

calculating a first distance between two key points preset on the first object;

calculating an offset of the second object based on the first distance;

in accordance with the position of the second object in the first video frame image and the offset of the second object, overlapping the second object as a foreground image on the third object in the second video frame image to obtain the third video frame image.

Furthermore, the calculating an offset of the second object based on the first distance comprises:

acquiring a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;

calculating the offset of the second object based on the first distance, the yaw angle and the pitch angle.

Furthermore, in accordance with the position of the second object in the first video frame image and the offset of the second object, overlapping the second object as a foreground image on a third object in the second video frame image to obtain the third video frame image comprises:

performing position offset on an initial anchor point of the second object in the first video frame image in accordance with the offset of the second object to obtain a target anchor point;

in the second video frame image, rendering the second object as a foreground image to the position of the target anchor point to obtain the third video frame image.

Furthermore, the method further comprises, after obtaining the third video frame image:

converting color spaces of the second object and the third object in the third video frame image to a HSV color space from a RGB color space;

replacing a value of the second object in H channel in the HSV color space with a value of the third object in the H channel;

converting the color spaces of the second object and the third object from the HSV space to the RGB color space to obtain a fourth video frame image.

According to one or more embodiments of the present disclosure, there provides an image processing apparatus, comprising:

an object identification module configured to identify a first object in a first video frame image and a second object located in the first object;

a second video frame image generation module configured to, in accordance with a position of the first object in the first video frame image, overlay a third object as a foreground image on the first video frame image to obtain a second video frame image; wherein the third object overlays the first object in the second video frame image;

a third video frame generation module configured to, in accordance with a position of the second object in the first video frame image, overlap the second object as a foreground image on the third object of the second video frame image to obtain a third video frame image.

Furthermore, the object identification module is further configured to:

identify a plurality of first key points of the first object and a plurality of second key points of the second object in the first video frame image;

identify the first object based on the plurality of first key points of the first object;

identify the second object based on the plurality of second key points of the second object, wherein the plurality of second key points are edge key points of the second object.

Furthermore, the second video frame image generation module is further configured to:

calculate an anchor point of the first object in the first video frame image based on the plurality of first key points of the first object in the first video frame image;

by aligning an anchor point of the third object with the anchor point of the first object in the first video frame image, overlay the third object as a foreground image in the first video frame image to obtain the second video frame image.

Furthermore, the second video frame image generation module is further configured to:

calculate a first distance between two key points preset on the first object;

calculate an offset of the second object based on the first distance;

in accordance with the position of the second object in the first video frame image and the offset of the second object, overlap the second object as a foreground image on the third object in the second video frame image to obtain the third video frame image.

Furthermore, the calculate an offset of the second object based on the first distance comprises:

acquire a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;

calculate the offset of the second object based on the first distance, the yaw angle and the pitch angle.

Furthermore, in accordance with the position of the second object in the first video frame image and the offset of the second object, overlap the second object as a foreground image on the third object in the second video frame image to obtain the third video frame image comprises:

perform position offset on an initial anchor point of the second object in the first video frame image in accordance with the offset of the second object to obtain a target anchor point;

in the second video frame image, render the second object as a foreground image to the position of the target anchor point to obtain the third video frame image.

Furthermore, the image processing apparatus further comprises:

a fourth video image generation module configured to convert color spaces of the second object and the third object in the third video frame image to a HSV color space from a RGB color space; replace a value of the second object in H channel in the HSV color space with a value of the third object in the H channel; and convert the color spaces of the second object and the third object from the HSV space to the RGB color space to obtain a fourth video frame image.

According to one or more embodiments of the present disclosure, a computer program is provided, and when the computer program runs on a computer, the computer executes the image processing method provided by the embodiments of the present disclosure.

The above description is only the embodiment of the present disclosure and the explanation of the applied technical principle. It should be understood by those skilled in the art that the disclosure scope involved in this disclosure is not limited to the technical scheme formed by the specific combination of the above technical features, but also encompasses other technical schemes formed by any combination of the above technical features or their equivalent features without departing from the above disclosed concept. For example, the technical solution formed by exchanging the above features with technical features with similar functions disclosed in (but not limited to) this disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

What claimed is:

1. An image processing method, comprising:
identifying a first object in a first video frame image and a second object located in the first object;
in accordance with a position of the first object in the first video frame image, overlaying a third object as a foreground image on the first video frame image to obtain a second video frame image; wherein the third object overlays the first object in the second video frame image;
in accordance with a position of the second object in the first video frame image, overlapping the second object as a foreground image on the third object of the second video frame image to obtain a third video frame image,
wherein in accordance with the position of the second object in the first video frame image, overlapping the second object as a foreground image on the third object of the second video frame image to obtain a third video frame image comprises:
calculating a first distance between two key points preset on the first object;
acquiring a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;
calculating the offset of the second object based on the first distance, the yaw angle and the pitch angle; and
in accordance with the position of the second object in the first video frame image and the offset of the second object, overlapping the second object as a foreground image on the third object in the second video frame image to obtain the third video frame image.

2. The image processing method of claim 1, wherein the identifying a first object in a first video frame image and a second object located in the first object comprises:
identifying a plurality of first key points of the first object and a plurality of second key points of the second object in the first video frame image;
identifying the first object based on the plurality of first key points of the first object;
identifying the second object based on the plurality of second key points of the second object, wherein the plurality of second key points are edge key points of the second object.

3. The image processing method of claim 2, wherein in accordance with the position of the first object in the first video frame image, overlaying a third object as a foreground image on the first video frame image to obtain a second video frame image comprises:
calculating an anchor point of the first object in the first video frame image based on the plurality of first key points of the first object in the first video frame image;
by aligning an anchor point of the third object with the anchor point of the first object in the first video frame image, overlaying the third object as a foreground image in the first video frame image to obtain the second video frame image.

4. The image processing method of claim 1, wherein in accordance with the position of the second object in the first video frame image and the offset of the second object, overlapping the second object as a foreground image on a third object in the second video frame image to obtain the third video frame image comprises:
   performing position offset on an initial anchor point of the second object in the first video frame image in accordance with the offset of the second object to obtain a target anchor point;
   in the second video frame image, rendering the second object as a foreground image to a position of the target anchor point to obtain the third video frame image.

5. The image processing method of claim 1, further comprises, after obtaining the third video frame image:
   converting color spaces of the second object and the third object in the third video frame image from a RGB color space to a HSV color space;
   replacing a value of the second object in H channel in the HSV color space with a value of the third object in the H channel;
   converting the color spaces of the second object and the third object from the HSV space to the RGB color space to obtain a fourth video frame image.

6. An electronic device, comprising:
   a memory for storing computer readable instructions; and
   a processor for executing the computer readable instructions, so that the computer readable instructions, when executed by the processor, cause the processor to:
   identify a first object in a first video frame image and a second object located in the first object;
   in accordance with a position of the first object in the first video frame image, overlay a third object as a foreground image on the first video frame image to obtain a second video frame image, wherein the third object overlays the first object in the second video frame image;
   in accordance with a position of the second object in the first video frame image, overlap the second object as a foreground image on the third object of the second video frame image to obtain a third video frame image,
   wherein the computer readable instructions include further instructions, when executed by the processor, cause the processor to, in accordance with the position of the second object in the first video frame image, overlap the second object as a foreground image on the third object of the second video frame image to obtain a third video frame image by:
   calculating a first distance between two key points preset on the first object;
   acquiring a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;
   calculating the offset of the second object based on the first distance, the yaw angle and the pitch angle; and
   in accordance with the position of the second object in the first video frame image and the offset of the second object, overlapping the second object as a foreground image on the third object in the second video frame image to obtain the third video frame image.

7. The electronic device of claim 6, wherein the computer readable instructions include further instructions, when executed by the processor, cause the processor to identify a first object in a first video frame image and a second object located in the first object by:
   identifying a plurality of first key points of the first object and a plurality of second key points of the second object in the first video frame image;
   identifying the first object based on the plurality of first key points of the first object;
   identifying the second object based on the plurality of second key points of the second object, wherein the plurality of second key points are edge key points of the second object.

8. The electronic device of claim 7, wherein the computer readable instructions include further instructions, when executed by the processor, cause the processor to, in accordance with the position of the first object in the first video frame image, overlay a third object as a foreground image on the first video frame image to obtain a second video frame image by:
   calculating an anchor point of the first object in the first video frame image based on the plurality of first key points of the first object in the first video frame image;
   by aligning an anchor point of the third object with the anchor point of the first object in the first video frame image, overlaying the third object as a foreground image in the first video frame image to obtain the second video frame image.

9. The electronic device of claim 8, wherein the computer readable instructions include further instructions, when executed by the processor, cause the processor to, in accordance with the position of the second object in the first video frame image and the offset of the second object, overlap the second object as a foreground image on a third object in the second video frame image to obtain the third video frame image by:
   performing position offset on an initial anchor point of the second object in the first video frame image in accordance with the offset of the second object to obtain a target anchor point;
   in the second video frame image, rendering the second object as a foreground image to a position of the target anchor point to obtain the third video frame image.

10. The electronic device of claim 6, wherein the computer readable instructions include further instructions, when executed by the processor, cause the processor to, after obtaining the third video frame image:
   convert color spaces of the second object and the third object in the third video frame image from a RGB color space to a HSV color space;
   replace a value of the second object in H channel in the HSV color space with a value of the third object in the H channel;
   convert the color spaces of the second object and the third object from the HSV space to the RGB color space to obtain a fourth video frame image.

11. A non-transitory computer readable storage medium for storing computer readable instructions which, when executed by a computer, cause the computer to:
   identify a first object in a first video frame image and a second object located in the first object;
   in accordance with a position of the first object in the first video frame image, overlay a third object as a foreground image on the first video frame image to obtain a second video frame image, wherein the third object overlays the first object in the second video frame image;
   in accordance with a position of the second object in the first video frame image, overlap the second object as a foreground image on the third object of the second video frame image to obtain a third video frame image, wherein the computer readable instructions include further instructions, when executed by the computer, cause the computer to, in accordance with the position of the second object in the first video frame image, overlap the second object as a foreground image on the third object of the second video frame image to obtain a third video frame image by:

calculating a first distance between two key points preset on the first object;

acquiring a yaw angle and a pitch angle of the first object, wherein the yaw angle is a horizontal angle between an orientation of the first object in the first video frame image and a lens shooting direction, and the pitch angle is a vertical angle between the orientation of the first object in the first video frame image and the lens shooting direction;

calculating the offset of the second object based on the first distance, the yaw angle and the pitch angle; and in accordance with the position of the second object in the first video frame image and the offset of the second object, overlapping the second object as a foreground image on the third object in the second video frame image to obtain the third video frame image.

12. The non-transitory computer readable storage medium of claim 11, wherein the computer readable instructions include further instructions, when executed by the computer, cause the computer to identify a first object in a first video frame image and a second object located in the first object by:

identifying a plurality of first key points of the first object and a plurality of second key points of the second object in the first video frame image;

identifying the first object based on the plurality of first key points of the first object;

identifying the second object based on the plurality of second key points of the second object, wherein the plurality of second key points are edge key points of the second object.

13. The non-transitory computer readable storage medium of claim 12, wherein the computer readable instructions include further instructions, when executed by the computer, cause the computer to, in accordance with the position of the first object in the first video frame image, overlay a third object as a foreground image on the first video frame image to obtain a second video frame image by:

calculating an anchor point of the first object in the first video frame image based on the plurality of first key points of the first object in the first video frame image;

by aligning an anchor point of the third object with the anchor point of the first object in the first video frame image, overlaying the third object as a foreground image in the first video frame image to obtain the second video frame image.

14. The non-transitory computer readable storage medium of claim 11, wherein the computer readable instructions include further instructions, when executed by the computer, cause the computer to, in accordance with the position of the second object in the first video frame image and the offset of the second object, overlap the second object as a foreground image on a third object in the second video frame image to obtain the third video frame image by:

performing position offset on an initial anchor point of the second object in the first video frame image in accordance with the offset of the second object to obtain a target anchor point;

in the second video frame image, rendering the second object as a foreground image to a position of the target anchor point to obtain the third video frame image.

* * * * *